US005769646A

United States Patent [19]
Cavello et al.

[11] Patent Number: 5,769,646
[45] Date of Patent: Jun. 23, 1998

[54] INTEGRATED ELECTRICAL CONNECTOR GUARD DEVICE FOR USE IN A PERSONAL COMPUTER

[75] Inventors: Christopher Cavello; Russell B. Smith, both of Austin, Tex.

[73] Assignee: Dell U.S.A., L.P., Austin, Tex.

[21] Appl. No.: 506,527

[22] Filed: Jul. 25, 1995

[51] Int. Cl.$^6$ .................................................. H01R 13/44
[52] U.S. Cl. ...................... 439/136; 439/928.1; 439/942
[58] Field of Search ................................. 439/76.1, 136, 439/942, 928.1, 374

[56] References Cited

U.S. PATENT DOCUMENTS

| | | | |
|---|---|---|---|
| 4,984,982 | 1/1991 | Brownlie et al. | 439/942 X |
| 5,142,573 | 8/1992 | Umezawa | 439/136 X |
| 5,199,888 | 4/1993 | Condra et al. | 439/136 X |
| 5,224,869 | 7/1993 | Lee | 439/136 |
| 5,315,478 | 5/1994 | Cadwell et al. | 439/374 X |

*Primary Examiner*—Jes F. Pascua
*Attorney, Agent, or Firm*—Haynes and Boone, L.L.P.

[57] ABSTRACT

The present invention provides, for use in a personal computer having a chassis with an electrical interface configured to form a connection with an electrical apparatus that extends externally from the chassis, an electrical connector protection device. The protection device comprises an electrical connector guard movably coupled to the chassis adjacent the interface to move between a retracted storage position and an extended guard position with respect to the chassis. The electrical connector guard, when in the extended guard position, is configured to guard and protect the electrical interface and the electrical apparatus from sustaining damage when the two are connected together by extending under a portion of the electrical apparatus, to thereby guard and protect the electrical interface and the electrical apparatus from sustaining damage.

26 Claims, 3 Drawing Sheets

INTEGRATED ELECTRICAL CONNECTOR GUARD DEVICE FOR USE IN A PERSONAL COMPUTER

TECHNICAL FIELD OF THE INVENTION

The present invention is directed, in general, to a personal computer, and more specifically a portable computer having an integrated electrical connector guard device incorporated therein.

BACKGROUND OF THE INVENTION

The use of and advantages associated with portable computers are well known in the art. Over the last decade, there has been an intense effort in the computer industry to down size the personal computer ("PC") to provide users with a powerful yet portable computer that can be taken out of the office and filly utilized at home or on the road. As advancements have been made in both microprocessing chip and battery technologies, particularly over the last decade, PCs were eventually downsized into "laptop computers". While these computers offered the portability and processing power of a full sized PC, the laptop was still somewhat large and heavy for the user to carry around. In response to these disadvantages, the laptops were downsized even further into what is now commonly known in the industry as a notebook computer, which is smaller and more light weight yet possessing equal or greater processing capabilities than their earlier laptop counterpart.

In order to achieve a useful portable computer in the size of the notebook computers presently known in the art, many design processing and space saving changes occurred both in the electronics portion of the computer and in the exterior design. However, while the size of these portable computers has decreased, the expectations of the user with respect to the processing capacity and interfacing capabilities have expanded.

Thus, to accommodate this expanding need for a "super" portable computer, portable computer memory card international association ("PCMCIA") cards, which are small expansion modules each roughly the size and shape of a credit card, have been developed. These PCMCIA cards allow the user to temporarily expand the processing or interfacing capabilities of a portable computer with the insertion of a single card into the computer and interfacing it with the motherboard in the computer. Several different types of PCMCIA cards are presently available to portable computer users. These PCMCIA cards are often used in conjunction with a computer to easily, rapidly and interchangeably add various operational capabilities to the computer such as additional memory, enhanced video characteristics, networking or a fax/modem. For instance, some PCMCIA cards have been designed to allow the user to increase the RAM processing memory of the personal computer or interface the personal computer with varying types of Networks systems, such as Local Area Networks ("LAN"). Other PCMICA cards, alternatively, have been designed to operate as a modem or even as a supplemental hard disk drive. These and other various types of PCMCIA cards are now commercially available and extensively used.

Typically, a PCMCIA card is insertable through an exterior housing side wall slot of the computer into an interior housing card chamber within which a PCMCIA frame or connector having an ejector mechanism associated therewith is positioned. The inner end of the inserted card is forcibly plugged into and electrically connected to a PCMCIA frame that is, in turn, electrically connected to the computer system planar or motherboard. The outer end of the PCMCIA card has an electrical plug connected thereto for electrically connecting the PCMCIA card to another electrical device, such as a variety of connector plugs for communications, network system, etc.

While PCMCIA cards greatly expand the utility of portable computers, the plugs connected to the outer end of the PCMCIA card are susceptible to being broken off or inadvertently disconnected because the plug typically extends outwardly from the computer's chassis a substantial distance. For example, when the user picks up the portable computer to move it, the user often fails to disconnect the plug from the PCMCIA card or remove the PCMCIA card from the personal computer. In picking up the machine, the user naturally pivots the device at the delicate juncture of the PCMCIA card and the connector plug, which often breaks or damages the interface or pins in the connector, the PCMCIA card, or both. In another example, a portable computer may be installed in a docking station that provides access to the PCMCIA plug when the portable computer is fully installed in the docking station. When the portable is removed from the docking station, the connector can shear off when it comes in contact with the support or housing components of the docking station. Yet another example is when the computer device, especially portable computers, are moved while the PCMCIA card is still in the computer, and the PCMCIA card is still connected to the cable. In such instances, the resistance of the cable or components connected to the cable either simply disconnect the plug or actually break it.

Other electrical connections between the computers electrical interface and an apparatus external to the computer are also extensively used. For instance, printer cables connector ends that connect to an interface positioned on the computers chassis are susceptible to damage resulting from a strong downward or upward force that may be applied against the connection point. In such instances, the resulting force can bend the connector pins and thus damage the printer cable's connector end or the interface device. Another example is where an external mouse device attaches to the computer. Prior art devices have provided a surface on which the mouse can be moved. Unfortunately, however, they are not designed to provide support to the electrical connection between the mouse cable and the computer's interface.

Moreover, most portable computers that have PCMCIA slots incorporated into their chassis included hinged covering doors that automatically cover the PCMCIA slot when not in use. While these doors function well to inhibit dirt and other debris from entering the interior portion of the chassis, they do not function to guard or protect the connection point between the interface and the electrical apparatus. In other models, there is a single hinged door covering the PCMCIA slot that functions primarily to cover the PCMCIA slot when it is not in use. Unfortunately, however, the door's length is not sufficient to guard or protect the connection point between the computer's interface and the electrical apparatus.

Thus, what is needed in the art is an integrated electrical connector guard for use in a personal computer that functions to guard and protect an electrical apparatus that is connected to the interface of a personal computer such that the interface device or the electrical apparatus are not easily susceptible to damage when the two are connected together. Additionally, the electrical connector guard can also serve as a covering for a PCMCIA slot when the slot is not in use. The electrical connector guard of the present invention addresses these needs.

SUMMARY OF THE INVENTION

To address the above-discussed deficiencies of the prior art, the present invention provides an electrical connector protection device. The device is intended for use in a personal computer having a chassis with an electrical interface configured to form a connection with an electrical apparatus that extends externally from the chassis. The protection device comprises an electrical connector guard movably coupled to the chassis adjacent the interface to move between a retracted storage position and an extended guard position with respect to the chassis. When in the extended guard position, the electrical connector guard is configured to guard and protect the electrical interface and the electrical apparatus from sustaining damage when the two are connected together. In a preferred embodiment, the electrical connector guard extends under a portion of the electrical apparatus, to thereby guard and protect the electrical interface and the electrical apparatus from sustaining damage from an upward or downward force exerted against the electrical connector guard.

In a preferred embodiment, the electrical connector protection device further has an opening formed therein that is configured to receive an electrical cable therethrough. The opening provides a means for routing the cable from the electrical connector guard and retaining the cable in a relatively fixed position with respect to the chassis and the electrical connector protection device.

In a preferred embodiment, the electrical connector guard has a side wall joined to an elongated rectangular support wall. The support wall preferably forms a portion of a base wall of the chassis and covers a base wall opening formed in the base wall, even when in the extended guard position. Additionally, the side wall preferably forms a portion of a chassis side wall when the electrical connector guard is in the retracted storage position. In this particular embodiment, the opening through which the electrical cable is routed may be formed in the side wall of the electrical connector guard.

In another embodiment, the electrical connector guard further comprises detents formed in a side portion thereof configured to cooperatively and releasably engage locking projections coupled to the chassis adjacent the interface, to thereby secure the electrical connector guard at a selected extended position. The detents and locking projections may have various configurations. For example, the detents may be notches formed in the side edge of the base wall such that they engage the locking projections that are coupled to the chassis adjacent the interface. The locking projections may be of conventional configurations ranging from a spring-biased ball that partially protrudes from a ball housing to a flexible arm having one end attached to the chassis and a second semi-spherical end that engages the detents. Whatever configuration is used, the releasably engagable locking projections and detents serve to hold the electrical connector guard in a selected position to accommodate various sizes of electrical apparatus.

In a preferred embodiment, the electrical connector guard is slidably connected to the chassis and may be slidably coupled to the base wall of the chassis via a ledge formed in a side portion thereof that slidably engages a corresponding groove formed in the base wall opening of the chassis.

In another aspect, the present invention provides a personal computer comprising a chassis having a chassis side wall joined to a base wall. The base wall preferably has a base wall opening formed therein that is covered by the support wall of the electrical connector guard when it is the retracted storage position. The chassis side wall has an aperture with an electrical interface therein that is configured to form a connection with an electrical apparatus that extends externally from the chassis. In a preferred embodiment, the electrical interface is an exterior end of a PCMCIA card received in a PCMCIA frame positioned within an interior portion of the chassis, and the electrical apparatus is an electrical cable connector connectable to the exterior end. The chassis also may include a guard pocket positioned within an interior portion of the chassis. The guard pocket is configured and positioned to house a substantial portion of the electrical connector guard when in the retracted storage position. This embodiment further comprises an electrical connector protection device, including an electrical connector guard having a side wall joined to an elongated rectangular support wall and movably coupled to the chassis adjacent the interface to move between a retracted storage position and an extended guard position with respect to the chassis.

In a preferred embodiment, the electrical guard is moved via a sliding action wherein the electrical connector guard is slidably connected to the chassis. In such embodiments, the electrical connector guard preferably has a ledge formed in the support wall that is slidably engagable with a corresponding groove formed in the base wall of the chassis, which allows the electrical connector guard to be moved to an extended position. In a preferred embodiment, the groove is formed in a base wall opening formed within the chassis's base wall. When in the extend position, the electrical connector guard is configured to guard and protect the interconnected interface and the electrical apparatus from sustaining damage by extending under a portion of the electrical apparatus.

In another aspect of the embodiment just discussed above, the support wall preferably forms a portion of the base wall and covers the base wall opening. Additionally, the side wall preferably forms a portion of the chassis side wall and substantially covers the aperture when the electrical connector guard is in the retracted storage position.

In yet another aspect of the embodiment just discussed, the chassis further comprises locking projections coupled to and positioned within an interior portion of the chassis adjacent the aperture, and the electrical connector guard further comprises detents formed in the support wall configured to cooperatively and releasably engage the locking projections to thereby hold the electrical connector guard at a selected extended position.

Another aspect of the present invention provides a method of protecting and guarding an electrical interface within a chassis of a personal computer and an electrical apparatus from sustaining damage when the two are connected together. The method comprising the steps of 1) Extending an electrical connector guard from a retracted storage position to an extended position external to the chassis. The electrical connector guard has a side wall joined to an elongated rectangular support wall and is movably coupled to the chassis adjacent the electrical interface. When in the extended position, the electrical connector guard is configured to guard and protect the interface and the electrical apparatus from sustaining damage when the two are connected together. Preferably, the extending step includes the step of sliding the electrical connector guard with respect to the chassis and extending the electrical connector guard to extend under a portion of the electrical apparatus when connected to the electrical interface. In a preferred embodiment, the step of sliding includes the step of engaging a ledge formed in the support wall with a corresponding groove formed in the base wall of the chassis; and 2)

electrically connecting the electrical apparatus to the electrical interface. Preferably, the electrical interface is an exterior end of a PCMCIA card received in a PCMCIA frame positioned within an interior portion of the chassis, and the electrical apparatus is an electrical cable connector that is connectable to the exterior end.

The method may further include the step of routing a portion of an electrical cable connected to the electrical apparatus through an opening in the side wall.

In other embodiments, the method may further comprise the step of retracting the electrical connector guard to a storage position within an interior portion of the chassis and substantially covering the aperture the chassis side wall.

The method may also further comprise the step of releasably positioning the electrical connector guard to a selected extended position by engaging locking projections coupled to and positioned within an interior portion of the chassis with detents formed in the support wall.

In yet another embodiment, the method may further comprise the step of housing a substantial portion of the electrical connector guard within a guard pocket positioned in an interior portion of the chassis when the electrical connector guard is moved to the retracted storage position.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof reference is now made to the following descriptions taken in conjunction with the accompanying drawings, in which.

DETAILED DESCRIPTION

Figure 1:
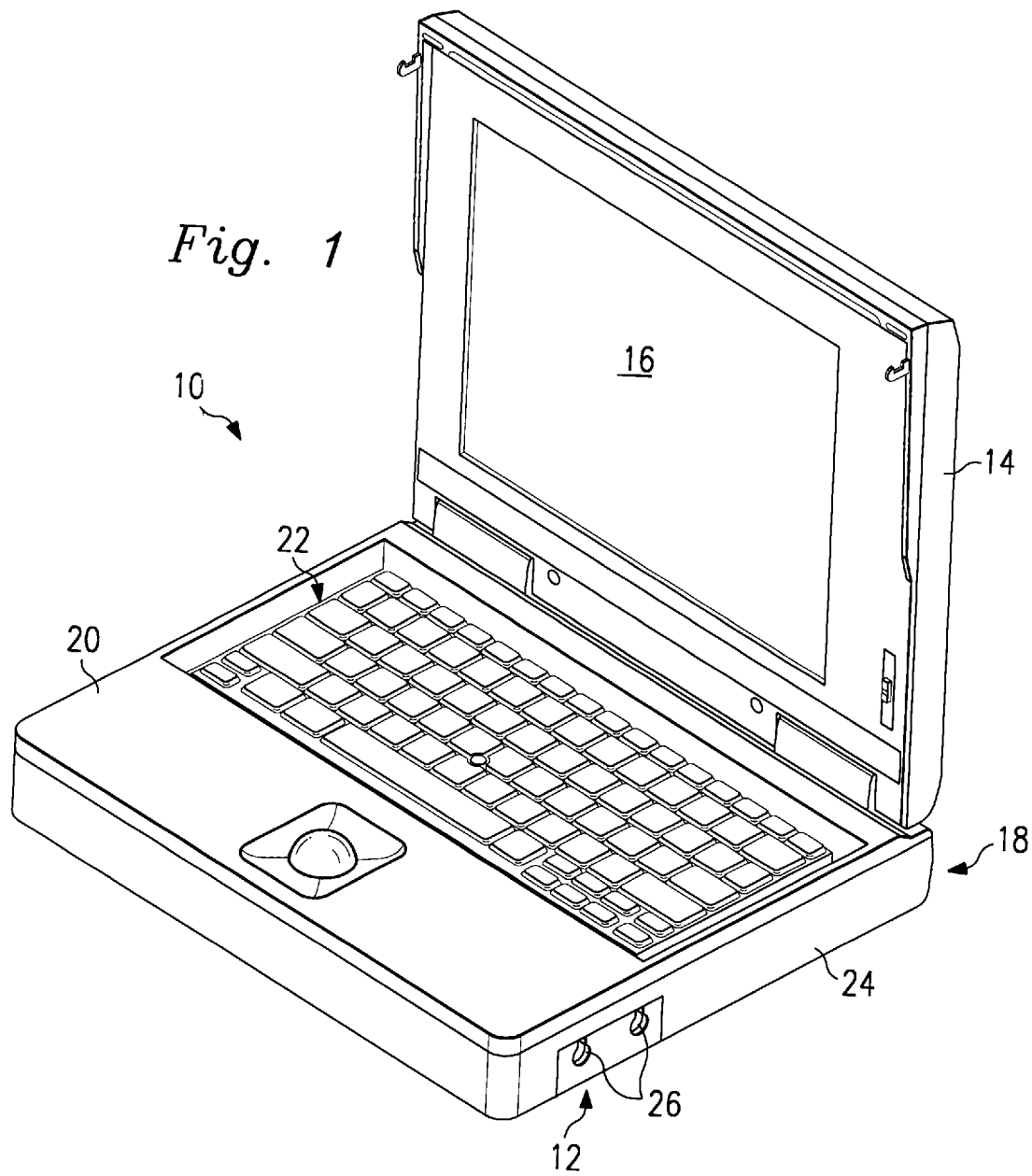
FIG. 1 illustrates an isometric view of a personal computer with the electrical connector guard incorporated therein.

Referring initially to FIG. 1, in a preferred embodiment thereof, there is illustrated a personal computer 10 with an electrical connector guard 12 incorporated therein. The personal computer 10 is preferably a notebook computer and having conventional electrical components housed therein and is comprised of a conventionally designed covering lid 14 that has a viewing screen 16 incorporated therein. The covering lid 14 is hingedly attached to a chassis 18 that has a top covering member 20 with a keyboard 22 and a chassis side wall 24. The electrical connector guard 12, which is shown in a retracted storage position, preferably forms a portion of the chassis side wall 24 when it is in the retracted storage position and has an opening 26 formed therein through which an electrical cable may extend.

Figure 2:
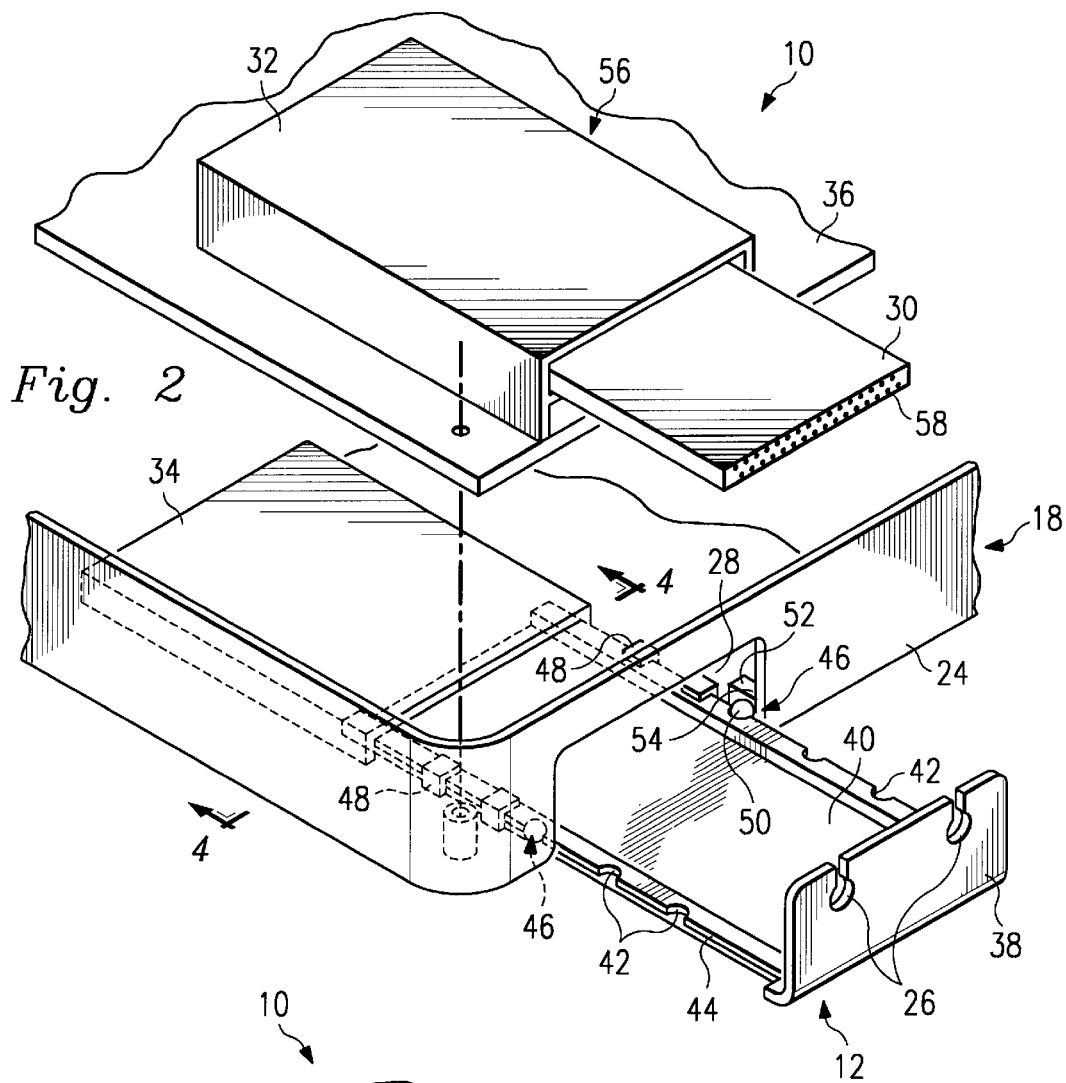
FIG. 2 illustrates an exploded isometric interior and exterior view of the personal computer chassis with the electrical connector guard in an extended position.

Referring now to FIG. 2, there is illustrated an exploded isometric interior and exterior view of a portion of the chassis 18 with the electrical connector guard 12 shown in an extended position. The chassis 18 has an aperture 28 formed in the chassis side wall 24 from which an electrical interface may extend. The electrical interface may have various configurations and applications. For example, the electrical interface may be a printer port or an exterior end of a PCMCIA card 30 received in a conventional PCMCIA frame 32 positioned within an interior portion of the chassis 18. Within an interior portion of the chassis 18 is a guard pocket 34 that is positioned adjacent the aperture 28 and configured to house a substantial portion of the electrical connector guard 12 when it is in the retracted storage position. The guard pocket 34 may serve many functions. First it provides a housing for the electrical connector guard 12. Second it serves as a support structure for a motherboard 36 to which the PCMCIA frame 32 may be attached. Third, it serves as a barrier to prevent debris from entering the interior portion of the chassis 18 when the electrical connector guard 12 is in an extended guard position.

The electrical connector guard 12 preferably has a side wall 38 joined to a support wall 40 with the openings 26 formed in the side wall 38 through which an electrical cable may extend. The openings 26 may have a notch-like design to allow an electrical cable to be easily inserted into and removed from the opening 26. In a preferred embodiment, the side wall 38 forms a portion of the chassis side wall 24 when the electrical guard 12 is in the retracted storage position and has a overall design and configuration that generally conforms with the chassis side wall 24. Preferably, the electrical connector guard 12 is comprised of the same hard rigid plastic from which the chassis 18 is constructed. In such instances, the side wall 38 is integrally formed with the support wall 40.

The support wall 40 preferably has a generally elongated rectangular shape and extends into the interior portion of the chassis 28 through the aperture 28. In preferred embodiments, the width of the guard pocket 34 does not substantially exceed the width of the electrical apparatus or the electrical interface, and the width of the support wall 40 is less than the width of the guard pocket 34 so that the support wall 40 can be received within the guard pocket 34. What is meant by "substantially exceed" can be determined from FIGS. 1–4 by one skilled in the art.

Detents 42 are formed on a side edge 44 of the support wall 40 and are cooperable with corresponding locking projections 46 that are coupled to the interior portion of the chassis 18 adjacent the aperture 28. Preferably, there are a plurality of spaced apart detents 42 that allow the electrical connector guard 12 to be held at varying positions with respect to the chassis 18. Electrical connector guard guides 48 are also preferably coupled to the interior portion of the chassis 18 and function to keep the electrical connector guard 12 properly aligned with respect to the guard pocket 34.

The locking projections 46 may have a variety of configurations. For example, they may be of conventional configurations ranging from a spring-biased ball that partially protrudes from a ball housing to a flexible arm having one end attached to the chassis and a second latching end that engages the detents. There are numerous other detent-locking projection configurations that will be apparent to those skilled in the art. In the preferred illustrated embodiment, the locking projections 46 are comprised of a ball 50 that partially protrudes from a ball housing 52. The ball 50 is biased outwardly from the ball housing 52 via a spring 54.

Exploded from the interior portion of the chassis 18, is a representative configuration of an electrical interface 56 that may be associated with the personal computer 10. In the preferred embodiment, the electrical interface 56 is comprised of the conventional PCMCIA card 30 or device such as a hard disk drive received in a conventional PCMCIA frame 32. The PCMCIA card 30 or device has an exterior end 58 with a conventional pin-socket or connector pin configuration that is connectable to an electrical apparatus (not shown) of a cable, such as a telecommunications or network cable. While the preferred PCMCIA electrical interface 56 has been illustrated, it will, of course, be appreciated that the electrical interface 56 could be a number of electrical interfaces typically associated with personal computers, such as a printer cable interface or a mouse-cable interface.

Figure 2A:
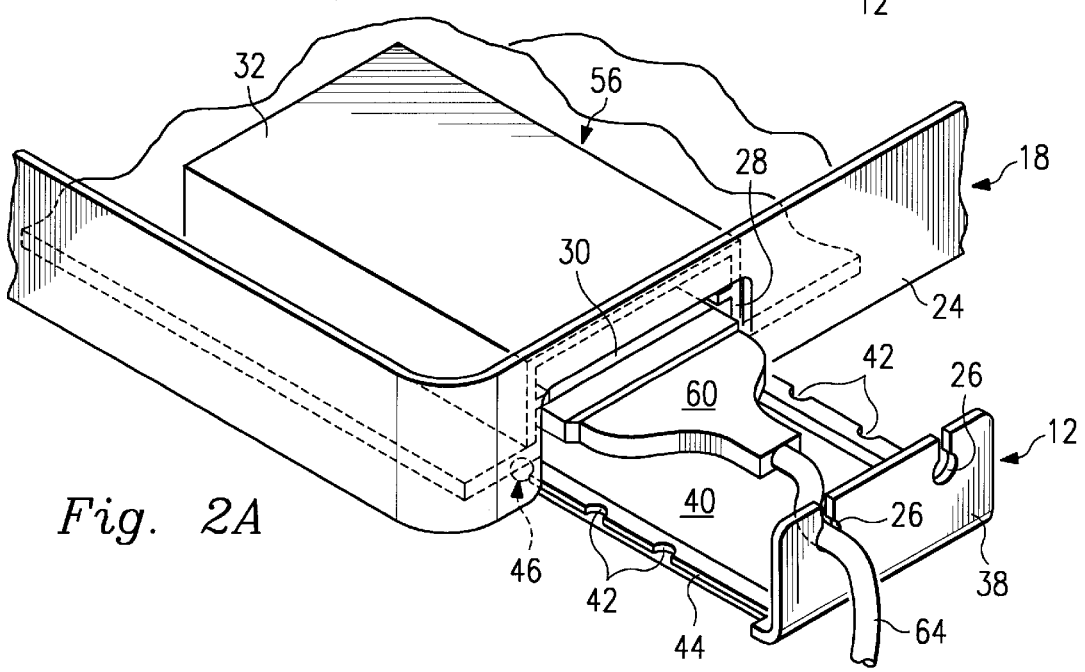
FIG. 2A illustrates an isometric interior and exterior view of the personal computer chassis with the electrical connector guard in an extended position and with the electrical apparatus connected to the interface of the personal computer.

Turning now to FIG. 2A, an electrical apparatus 60 electrically connected to the electrical interface 56 of the personal computer 10 is illustrated. As shown, the electrical connector guard 12 extends under a portion of the electrical apparatus 60, which extends outwardly from the chassis side wall 24. The electrical connector guard 12 guards and protects the electrical interface 56 and the electrical apparatus 60 from sustaining damage that might occur to either device when a strong upward or downward force is exerted against either apparatus. Such a force might arise when the electrical apparatus 60 is inadvertently hit by the user or forcefully contacted against another object such as a table top or docking station. Again, the type of electrical apparatus 60 that might be connected to the electrical interface 56 may vary greatly, depending on the application and design of the personal computer 10. However, in the preferred embodiment, the electrical apparatus 60 is a electrical connector typically associated with devices that are electrically connected to the PCMCIA card 30 or other PCMCIA devices.

Also shown in FIG. 2A are the openings 26 formed in the side wall 38 of the electrical connector guard 12 with an electrical cable 64 extending therethrough. As seen from FIG. 2A, the opening 26 functions to hold the electrical cable 64 in proper orientation with respect to the electrical connector guard 12 and the personal computer 10.

Figure 3:
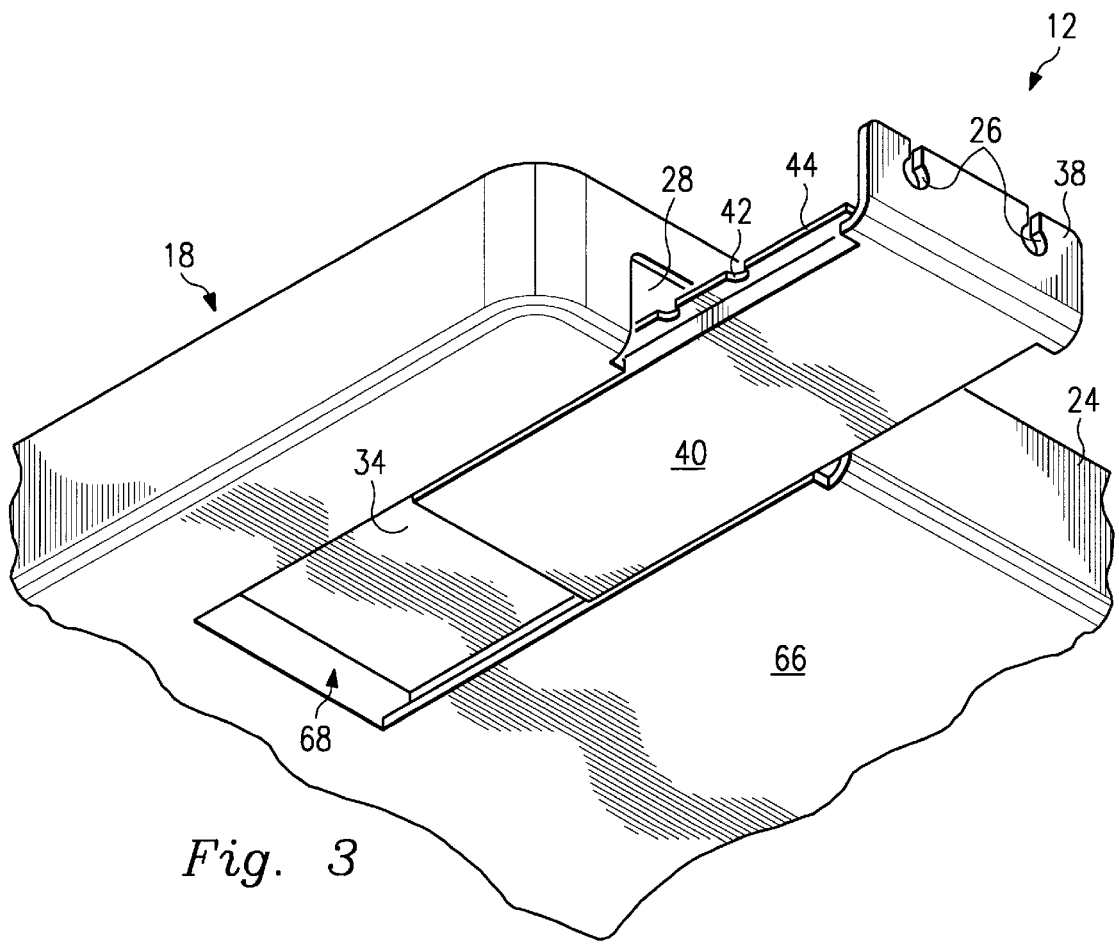
FIG. 3 illustrates an isometric view of the base wall of the chassis with the electrical connector guard in an extended position.

Referring now to FIG. 3, a base wall 66 of the chassis 18 with the electrical connector guard 12 extending from the chassis 18 is illustrated. As seen from FIG. 3, when the electrical connector guard 12 is in the extended position, a portion of the interior of the chassis 18 would normally be exposed to the surrounding environment through a base wall opening 68 formed in the base wall 66 of the chassis 18, thereby allowing dirt and other debris to enter the interior portion of chassis 18 and deposit on the sensitive electrical components housed therein. However, due to the presence of the guard pocket 34 the interior portion of the chassis 18 is not exposed to the environment. Also, it is clearly seen how the support wall 40 of the electrical connector guard 12 forms a portion of the base wall 66.

Figure 4:
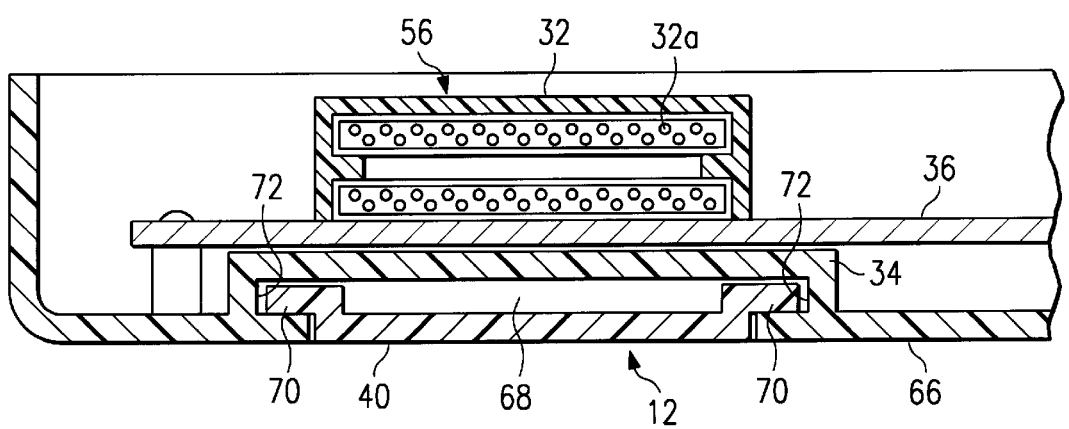
FIG. 4 illustrates a cross-sectional view of FIG. 2 taken along the line 4—4 showing the electrical connector guard slidably coupled to the chassis.

Turning now to FIG. 4, there is illustrated a cross-sectional view of FIG. 2 taken along the line 4—4. The PCMCIA card is not shown in this view. Thus, the PCMCIA frame's 32 electrical connectors 32a are shown. This particular figure illustrates the preferred embodiment of the electrical connector guard 12 that has ledges 70 formed on its opposite sides that allow the electrical connector guard 12 to be slidably coupled to the chassis 18. The ledges 70 are slidably received in opposing grooves 72 that are formed on opposite sides of the base wall opening 68.

With the electrical connector apparatus protection device having been described, its operation and use will now be briefly described with general reference to FIGS. 1–4. When the user wishes to connect an electrical apparatus to an interface of the computer, the user grasps the electrical connector guard and slidably moves the electrical connector guard to an extended position. Generally, the electrical connector guard will be in the retracted storage position and a substantial portion of the rectangular length of the electrical connector guard will be housed with the guard pocket positioned within the interior of the chassis. When the electrical connector guard is in this position, the support wall will cover the base wall opening and the side wall will cover the aperture formed in the chassis side wall in which the electrical interface is positioned.

As the electrical connector guard is being extended, the ledges that are formed on opposite sides of the electrical connector guard support wall are slidably received in the corresponding grooves on opposite sides of the base wall opening formed in the base wall of the chassis. The locking projections that are formed are opposite sides of the aperture incrementally engage the detents formed on opposite side edges of the support wall of the electrical connector guard. As the user extends the electrical connector guard from the chassis to the desired length the locking projections engage a set of detents. The user either supplies sufficient pulling force to disengage the locking projections from the detents, or manually presses against the locking detents or support wall to release the locking projections from the detents. In either case, once the locking projections are disengaged from the detents, the user continues to pull on the electrical connector guard until the locking projections engage the next set of detents. This procedure is repeated until the electrical connector guard has been extended to a length sufficient to accommodate the electrical apparatus to be connected to the computer's interface. When the electrical connector guard is extended, a portion of the chassis interior is exposed to the surrounding environment. However, due to the presence of the guard pocket, dirt and other debris is inhibited from entering the interior portions in which the sensitive electrical components are housed.

The electrical apparatus is connected to the computer's electrical interface and the cable attached to the electrical apparatus is then routed through the opening formed in the side wall of the electrical connector guard.

In preferred applications, the electrical interface will be the exterior end of a PCMCIA card or other PCMCIA device that is received in a conventional PCMCIA frame. In these instances, the exterior end of the PCMCIA card or device has an electrical interface to which the electrical apparatus may be electrically connected. In those applications involving PCMCIA cards, the PCMCIA card is first inserted into the PCMCIA frame after the electrical connector guard has been extended to the desired length. Once the PCMCIA card is fully positioned in the PCMCIA frame, the electrical apparatus is electrically connected to the exterior end of the PCMCIA card or device.

After the use of the computer's interface is complete, the electrical apparatus is disconnected, and the electrical connector guard is then pushed to its retracted storage position.

From the above description, it is apparent that the present invention provides, for use in a personal computer having a chassis with an electrical interface configured to form a connection with an electrical apparatus that extends externally from the chassis, an electrical connector protection device. The protection device comprises an electrical connector guard movably coupled to the chassis adjacent the interface to move between a retracted storage position and an extended guard position with respect to the chassis. The electrical connector guard, when in the extended guard position, is configured to guard and protect the electrical interface and the electrical apparatus from sustaining damage when the two are connected together by extending under a portion of the electrical apparatus, to thereby guard and protect the electrical interface and the electrical apparatus from sustaining damage.

Although the present invention and its advantages have been described in detail, those skilled in the art should understand that they can make various changes, substitutions and alterations herein without departing from the spirit and scope of the invention in its broadest form.

What is claimed is:

1. In a computer having a chassis with an electrical interface configured to form a connection with an associated electrical apparatus, an electrical protection device comprising:

an electrical connector guard movably coupled to said chassis adjacent said interface to move between a retracted storage position and an extended guard position with respect to said chassis, said electrical connector guard including walls configured to cover wall openings in and form a portion of the chassis when in said retracted position, and when in said extended position, said walls guard and protect said electrical interface and said electrical apparatus from sustaining damages when said electrical interface and said electrical apparatus are connected together;

said walls including a side wall joined to an elongated rectangular support wall; and said side wall having an opening formed therein configured to receive an electrical cable therethrough.

2. The electrical connector protection device of claim 1 wherein said support wall forms a portion of a base wall of said chassis and covers a base wall opening formed in said base wall of said chassis.

3. The electrical connector protection device of claim 1 wherein said side wall forms a portion of a chassis side wall when said electrical connector guard is in said retracted storage position.

4. The electrical connector protection device of claim 1 wherein said electrical connector guard further comprises detents formed in a side portion thereof configured to cooperatively and releasably engage locking projections coupled to said chassis adjacent said interface, to thereby secure said electrical connector guard at a selected extended position.

5. The electrical connector protection device of claim 1 wherein said electrical connector guard is slidably connected to said chassis.

6. The electrical connector protection device of claim 5 wherein said electrical connector guard has a ledge formed in a side portion thereof, said ledge slidably engagable with a corresponding groove formed in a base wall opening of said chassis.

7. A personal computer comprising:

a chassis having a chassis side wall joined to a chassis base wall, said chassis side wall having an opening with an electrical interface therein;

an electrical connector guard having a side wall joined to an elongated rectangular support wall and movably coupled to said chassis adjacent said interface to move between a retracted storage position and an extended guard position with respect to said chassis, said electrical connector guard side wall and support wall configured to cover wall openings in and form a portion of the chassis when in said retracted position, and when in said extended position, said walls guard and protect said electrical interface and said electrical apparatus from sustaining damage when connected together; and said side wall having an opening formed therein configured to receive an electrical cable therethrough.

8. A personal computer comprising:

a chassis having a chassis side wall joined to a chassis base wall, said chassis side wall having an aperture with an electrical interface therein, said electrical interface configured to form a connection with an electrical apparatus that extends externally from said chassis; and an electrical connector protection device including an electrical connector guard having a side wall joined to an elongated rectangular support wall and movably coupled to said chassis adjacent said interface to move between a retracted storage position and an extended guard position with respect to said chassis, said electrical connector guard, when in said extended position, configured to guard and protect said interface and said electrical apparatus from sustaining damage when connected together, said chassis having a base wall opening formed therein and said support wall forming a portion of said base wall and covering said base wall opening when said electrical connector guard is in said retracted storage position.

9. The personal computer claim 8 wherein said electrical connector guard is slidably connected to said chassis.

10. The personal computer of claim 9 wherein said electrical connector guard has a ledge formed in said support wall, said ledge slidably engagable with a corresponding groove formed in said base wall of said chassis.

11. The personal computer of claim 8 wherein said side wall forms a portion of said chassis side wall and substantially covers said aperture when said electrical connector guard is in said retracted storage position.

12. The personal computer of claim 8 wherein said chassis further comprises locking projections coupled to and positioned within an interior portion of said chassis adjacent said aperture; and said electrical connector guard further comprises detents formed in said support wall configured to cooperatively and releasably engage said locking projections to thereby hold said electrical connector guard at a selected extended position.

13. The personal computer of claim 8 wherein said electrical interface is an exterior end of a PCMCIA card received in a PCMCIA frame positioned within an interior portion of said chassis, and said electrical apparatus is an electrical cable connector connectable to said exterior end.

14. The personal computer of claim 8 wherein said chassis further comprises a guard pocket positioned within an interior portion of said chassis, said electrical guard pocket configured and positioned within said chassis to house a substantial portion of said electrical connector guard when said electrical connector guard is in said retracted storage position, said guard pocket further providing a barrier to prevent debris from entering said interior of said chassis.

15. The personal computer of claim 14 wherein a width of said guard pocket does not substantially exceed a width of said electrical apparatus and a width of said electrical connector guard is less than the width of said guard pocket such that said electrical connector guard may be received in guard pocket.

16. The personal computer of claim 8 wherein said electrical connector guard, when in said extended position, extends under a portion of said electrical apparatus to thereby guard and protect said electrical interface and said electrical apparatus from sustaining damage when connected together.

17. A method of protecting and guarding an electrical interface within a chassis of a personal computer and an electrical apparatus from sustaining damage when connected together, said electrical interface positioned within an opening formed in a side wall of said chassis, said method comprising the steps of:

extending an electrical connector guard from a retracted storage position, wherein the guard includes walls covering wall openings in and forming a portion of the chassis, to an extended position external to said chassis, said walls including a side wall joined to an elongated rectangular support wall and movably coupled to said chassis adjacent said electrical interface, said walls of said electrical connector guard, when in said extended position, configured to guard and protect said interface and said electrical apparatus from sustaining damage when connected together; and electrically connecting said electrical apparatus to said electrical interface.

18. The method of claim 17 further comprising the step of routing a portion of an electrical cable connected to said electrical apparatus through an opening in said side wall.

19. A method of protecting and guarding an electrical interface within a chassis of a personal computer and an electrical apparatus from sustaining damage when connected together, said electrical interface positioned within an aperture formed in a side wall of said chassis, said method comprising the steps of:

extending an electrical connector guard from a retracted storage position to an extended position external to said chassis, said electrical connector guard having a side wall joined to an elongated rectangular support wall and movably coupled to said chassis side wall and a base wall of said chassis adjacent said electrical interface, said electrical connector guard, when in said extended position, configured to guard and protect said interface and said electrical apparatus from sustaining damage when connected together said support wall forming a portion of said base wall and covering an opening formed in said base wall when said electrical connector guard is in said retracted storage position; and electrically connecting said electrical apparatus to said electrical interface.

20. The method of claim 19 further comprising the step of retracting said electrical connector guard to a storage position within an interior portion of said chassis and substantially covering said aperture said chassis side wall.

21. The method of claim 19 further comprising the step of releasably positioning said electrical connector guard to a selected extended position by engaging locking projections coupled to and positioned within an interior portion of said chassis with detents formed in said support wall.

22. The method of claim 21 wherein the step of sliding includes the step of engaging a ledge formed in said support wall with a corresponding groove formed in said base wall of said chassis.

23. The method of claim 19 wherein said step of extending includes the step of sliding said electrical guard with respect to said chassis.

24. The method of claim 19 wherein said electrical interface is an exterior end of a PCMCIA card received in a PCMCIA frame positioned within an interior portion of said chassis, and said electrical apparatus is an electrical cable connector connectable to said exterior end.

25. The method of claim 19 further comprising the step of housing a substantial portion of said electrical connector guard within a guard pocket positioned in an interior portion of said chassis when said electrical connector guard is moved to said retracted storage position.

26. The method of claim 19 wherein said extending step includes extending said electrical connector guard to extend under a portion of said electrical apparatus when connected to said electrical interface.

\* \* \* \* \*